JAMES P. REYNOLDS
HUBERT A. DYKSTRA
INVENTORS.

BY HUEBNER, BEEHLER
& WORREL

ATTORNEYS

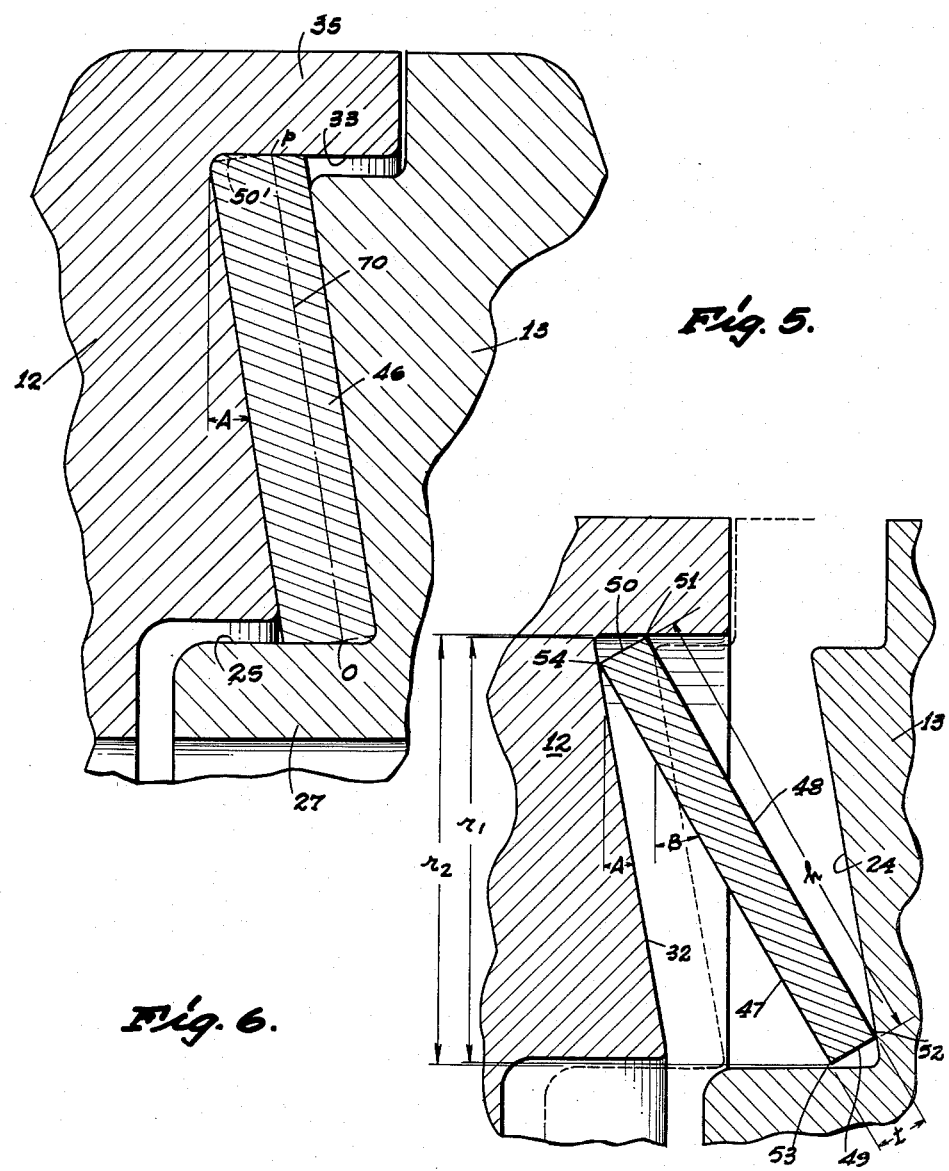

United States Patent Office 2,992,840
Patented July 18, 1961

2,992,840
PIPE COUPLING HAVING A DEFORMABLE SEALING ELEMENT
James P. Reynolds, Los Angeles, and Hubert A. Dykstra, Canoga Park, Calif., assignors to Aeroquip Corporation, Jackson, Mich., a corporation of Michigan
Filed Oct. 31, 1957, Ser. No. 693,741
7 Claims. (Cl. 285—332.3)

This invention relates to a coupled joint for use in a fluid system, the joint having matched flanges and a gasket positioned between the flanges for sealing the coupled joint.

It is a general object of this invention to provide a coupled joint having improved sealing characteristics.

A specific object of the invention is to provide a joint structure of the above mentioned character in which the gasket and the matched flanges thereof are so proportioned with respect to each other that when the flanges are tightened together the gasket becomes flexed beyond the elastic limit thereof and becomes constricted between opposed and radially spaced apart shoulders in the flanges. In being so flexed and constricted those edges of the gasket which engage the shoulders become coined and provide tight sealing of the gasket in the flanges so as to insure a leak-proof joint for a fluid system capable of withstanding high internal pressures and capable of withstanding vibrations and flexings of the joint.

Further objects and advantages of the invention will appear during the course of the following description wherein the details of construction and mode of operation of a preferred embodiment of the invention are described with reference to the accompanying drawing in which:

FIG. 5 is an enlarged radial section through the gasket and portions of the flanges when interengaged; and FIG. 6 is an enlarged radial section through the gasket and portions of the flanges before interengagement, with the relative position of the gasket when in its sealing position being shown in broken lines.

Figure 1:
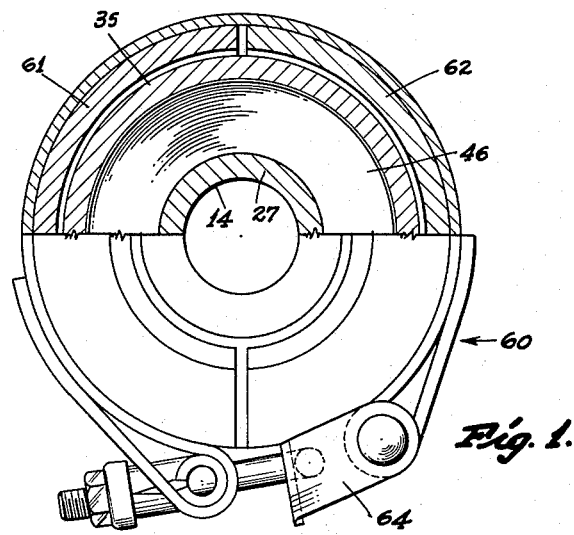
FIG. 1 is a view, partly in side elevation and partly in central vertical section, of a coupled joint embodying the invention.
Figure 2:
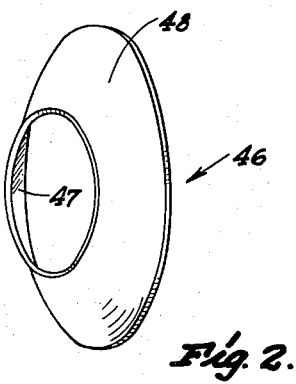
FIG. 2 is a perspective view of the gasket of the joint.
Figure 3:
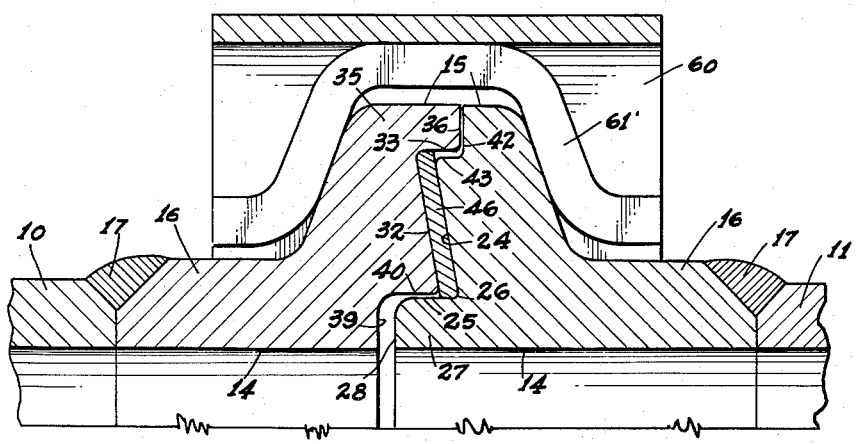
FIG. 3 is a central vertical axial section through a portion of the joint.

Referring to the drawing in greater detail, there is shown a joint structure for interconnecting and sealing the adjacent ends of two portions of the fluid system, i.e. tube sections 10 and 11, such joint comprising annular flanges 12 and 13, each having inner and outer cylindrical surfaces 14 and 15 respectively, and having cylindrical skirts 16. In the illustrated embodiment, the skirts of the flanges have an inside diameter equal to that of the tube sections, and the flanges are joined to the respective tube sections by welding as at 17. The flanges 12 and 13 have opposed insides which are designated generally by reference numerals 18 and 19, respectively. These insides are matable, the flange 12 being a female flange, and the flange 13 being a male flange. Numeral 20 designates the outside walls of the flanges, these being frusto-conical and slanted axially outwardly from outer cylindrical surfaces 15 to the outside surfaces of the skirts.

The inside 19 of the flange 13 has an annular groove 23 formed therein coaxially of the flange, to provide a concave frusto-conical face or surface 24 facing slightly inwardly toward the flange axis, and a cylindrical shoulder 25 facing outwardly from the flange axis and extending axially outwardly from the inner circumference of the face 24. The apex of the groove is truncated and rounded off as appears at 26. The groove further provides an annular projection 27 defined by the shoulder 25, inner cylindrical surface 14 and an annular end wall 28.

The inside 18 of flange 12, being substantially a complement of the inside 19, has an annular groove 31 formed therein providing a convex frusto-conical face or surface 32 facing slightly outwardly from the flange axis, and a cylindrical shoulder 33 facing inwardly toward the flange axis and extending axially outwardly from the outer circumference of the face 32 whereby these surfaces intersect along a rounded-off and circular apex 34. The shoulder 33 and outer cylindrical surface 15 define the side walls of an annular projection 35 having an end wall 36. As shown in the drawings, the frusto-conical faces 24 and 32 converge in the same axial direction.

The flange 12 has an annular rabbet 38 formed therein for accommodating the projection 27, such rabbet providing a bottom wall 39 and a radially inwardly facing cylindrical wall 40 which defines the inner circumference of frusto-conical face 32. Likewise, the flange 13 has an annular rabbet 41 having a bottom wall 42 and a radially outwardly facing cylindrical wall 43 which defines the outer circumference of frusto-conical face 24. These rabbets are of slightly greater radial dimension than the projections which are received in them.

The gasket for the joint is designated generally by numeral 46. It is received between the opposed frusto-conical faces of the flanges. The gasket is substantially rigid, being formed of a material (e.g. aluminum, copper, and alloys thereof) softer than that, e.g. stainless steel, from which the flanges are formed. The flanges and the gasket may be formed of the same metal, e.g. stainless steel, and in such cases the gasket is annealed to make it softer than the flanges. Preferably the flanges are about 25% harder than the gasket.

The gasket is frusto-conical having inner and outer side surfaces 47 and 48, respectively, and inner and outer end surfaces 49 and 50, respectively. In the illustrated embodiment the gasket is rectangular in radial section for use with flanges having frusto-conical faces which are parallel to each other. The gasket corners or annular meeting edges of the side and end surfaces are designated by numerals 51, 52, 53, and 54, respectively.

Figure 4:
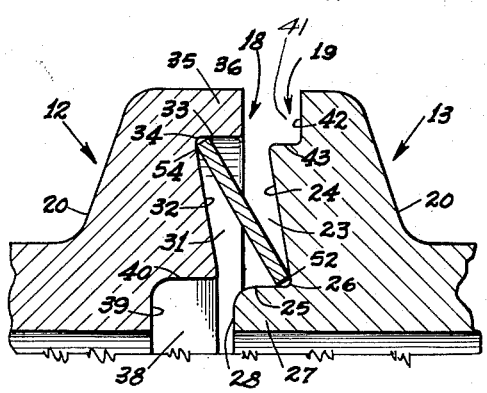
FIG. 4 is a sectional view corresponding to that of FIG. 3, but showing only the flanges and the gasket and these in their relative positions before interengagement of the parts.

The slant or angle of inclination of the side surfaces of the gasket, with respect to a plane normal to the axis of the gasket, is substantially greater than that of the frusto-conical faces of the flanges. In other words, the cone angle of the gasket is smaller than the cone angle of either of the frusto-conical faces of the flanges. Thus, when the gasket is placed between the flanges, around projection 27, in the position shown in FIG. 4 of the drawing with the gasket tapering in the same axial direction as the frusto-conical faces of the flanges, before pressure is applied to the flanges to draw them toward each other, the circular edge 54 of the gasket contacts the frusto-conical face 32 and the edge 52 contacts the frusto-conical face 24.

For drawing the flanges together, the coupling includes a V-band 60 which is preferably formed of two semi-circular sections 61 and 62 spot-welded or otherwise suitably attached to a constrictor band 63 of a flexible metal, having take-up latch means indicated generally at 64 for radially constricting or shortening the band circumferentially around the flanges. The flanges extend into the V-band sections with the outside walls 26 of the flanges being engaged by the inside walls respectively of the V-band sections, so that as the latch means 64 is tightened, the V-band sections draw the flanges 12 and 13 toward each other.

The gasket and flanges are so designed that when the joint is made tight, the gasket will have become stressed to a condition in which its slant is about the same as that of the frusto-conical faces of the flanges and two fluid tight seals will be formed against the flange shoulders in the groove apexes 26 and 34. In forming these seals the gasket becomes stressed beyond its elastic limit and the gasket edges become coined, as it explained more fully hereinafter, to the end that the gasket substantially fills the space between the opposed frusto-conical faces of the flanges and between the opposed shoulders 25 and 33. As is obvious, upon tightening of the coupling, the faces 24 and 32 of the flanges will engage opposed faces of the gasket to prevent buckling of the gasket. The seals so provided will remain secure and fluid tight even under conditions in use of severe vibration and flexing of the joint. Also inasmuch as the joint of this invention is designed for use in installations requiring disconnection of the tube sections, it is important that the interengagement of the gasket and flanges be such as will not prevent disconnection.

In FIG. 5, the gasket is shown in radial section in its stressed or sealing position. In being stressed by the flanges to that position, the edges 51 and 54 of the gasket become coined by engagement with shoulder 33 and frusto-conical face 32 respectively, i.e. the material in these edges, being softer than that of the flanges, is caused to flow in a direction centrally of the outer end surface 50 of the gasket, with the result that the outer end surface becomes bulged outwardly, as from the broken line 50', to substantially fill the space contiguous the shoulder 33 in the curved apex of the groove 31. In like manner the inner edges 53 and 52 of the gasket become coined by the shoulder 25 and frusto-conical face 24 respectively to bulge the inner end surface 49 of the gasket to substantially fill the space contiguous the shoulder 25 in the curved apex of groove 23. Stated otherwise, when the gasket and flanges are in their seating positions, the slant height of the gasket measured along a line 70 in a plane containing the axis of the gasket, from a point $p$ in the outer end surface 50 (i.e. between the side surfaces 47 and 48) to a point O in the inner end surface 49 (i.e. between the side surfaces 47 and 48) is equal to the slant height or distance between the shoulders 25 and 33 measured along the line 70.

The mating rabbets and projections of the flanges are so dimensioned that they do not sustain any of the force exerted by the V-band constrictor, all of that force being applied directly to the gasket. To this end, the rabbets are large enough that when the frusto-conical faces of the flanges contact the side surfaces of the gasket, the walls of the projections are still spaced slightly from the walls of the respective rabbets.

In order that the gasket may be fitted around the projection 27 and within the projection 35 before being stressed to its seating position, it is made slightly less in radial dimension than the space between the shoulders 25 and 33, i.e. the perpendicular distance $r_1$ (see FIG. 6) between the edges 51 and 53 of the gasket when the gasket is in its unstressed condition is slightly less than the perpendicular distance $r_2$ between the shoulders 25 and 33. In practice this difference should be about .030 inch.

There is a practical minimum limit for the angle of slant of the faces 24 and 32. In joints having an angle of slant of the faces (angle A in FIG. 5) less than 7 degrees, the flanges may not without great difficulty be separated when it is desired to disconnect the tube sections. Disengagement of the gasket from the flanges can be effected easily when desired in joints in which the slant of the frusto-conical faces, i.e. (angle A) is at least about 10 degrees. For a coupling in which angle A equals 10 degrees, the angle of slant for the gasket should be about 30 degrees.

The relationship of the slant for the gasket and that for the frusto-conical faces of the flanges is expressed in the following equation:

$$\cosine\left(B - \arctan\frac{t}{h}\right) = \cosine\left(A - \arctan\frac{t}{h}\right) - \frac{r_2 - r_1}{\sqrt{h^2 + t^2}}$$

in which:

$A$ = the angle of slant of the frusto-conical faces of the flanges, expressed in degrees,
$B$ = the angle of slant of the side surfaces of the gasket, expressed in degrees,
$h$ = the slant height of the side surfaces of the gasket, expressed in inches,
$t$ = the thickness of the gasket, expressed in inches,
$r_1$ = the perpendicular dimension between gasket edges 51 and 53 when the angle of slant of the side surfaces of the gasket equals angle B, and
$r_2$ = the perpendicular dimension between shoulders 25 and 33.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

What we claim is:

1. A joint for interconnecting two adjacent portions of a fluid conduit system, comprising a pair of annular flanges formed of metal and having interfacing surfaces and adapted to be mounted on the adjacent ends of the portions respectively, with the flanges in axial alignment with each other and with their interfacing surfaces in opposed relationship, a resilient metal gasket adapted to be positioned between the interfacing surfaces of the flanges, and clamping means for applying axial pressure to the flanges drawing them toward each other; said interfacing surfaces having frusto-conical faces with the face on one flange facing inwardly toward the axis of the flanges and the face on the other flange facing outwardly away from said axis, the slant of said faces being at a predetermined angle with respect to a plane perpendicular to said axis, one of said flanges having an annular projection extending outwardly from the inner circumference of its frusto-conical face to define an annular shoulder facing outwardly from said axis, the other of said flanges having an annular projection extending outwardly from the outer circumference of its frusto-conical face to define an annular shoulder facing inwardly toward said axis, the outer circumference of the frusto-conical face of said one flange being receivable within the annular shoulder of the other flange and the inner circumference of the other flange being receivable around the annular shoulder of said one flange, the radial dimension between said shoulders being of a predetermined value; the gasket being at least as soft as that of the flanges and having parallel inner and outer frusto-conical side surfaces and an annular outer end surface defining the outer circumferences of said side surfaces and an annular inner end surface defining the inner circumferences of said side surfaces, whereby an outer circular meeting edge is defined between the outer end surface and the outer side surface, and an inner circular meeting edge is defined between the inner end surface and the inner side surface, the slant of said frusto-conical side surfaces being greater than that of the frusto-conical faces of the flanges, the perpendicular dimension between said meeting edges being slightly greater than said predetermined value when the gasket is flexed to a position such that its angle of slant is equal to that of the frusto-conical faces of the flanges, the configuration of the gasket being related to that of the frusto-conical faces of the flanges substantially according to the following equation:

$$\cosine\left(B - \arc\tan\frac{t}{h}\right) = \cosine\left(A - \arc\tan\frac{t}{h}\right) - \frac{r_2 - r_1}{\sqrt{h^2 + t^2}}$$

wherein:

$A$ = the angle of slant of the frusto-conical faces of the flanges, expressed in degrees,
$B$ = the angle of slant of the side surfaces of the gasket, expressed in degrees,
$h$ = the slant height of the side surfaces of the gasket, expressed in inches,
$t$ = the thickness of the gasket, expressed in inches,
$r_1$ = the perpendicular dimension between said meeting edges when the angle of slant of the side surfaces of the gasket equals angle B, and
$r_2$ = the perpendicular dimension between the shoulders.

2. The joint of claim 1 in which angle A is greater than 7° and not greater than 45°.

3. The joint of claim 1 in which angle A is about 10°.

4. A joint structure comprising two members having opposed adjacent faces, at least one member having a central opening formed therein for accommodating a fluid, said members having portions of their opposed faces formed as opposed and axially aligned frusto-conical surfaces, said surfaces converging in the same axial direction; means for drawing said members axially toward each other; a substantially rigid annular frusto-conical gasket between said frusto-conical surfaces and tapering in the same direction as said surfaces but having a smaller cone angle than the cone angle of either of said surfaces whereby the inner periphery of said gasket bears against one of said surfaces and the outer periphery bears against the other surface; rigid shoulders of fixed diameters on said members extending generally axially and at angles no greater than 90° from said surfaces engaging and confining the inner and outer peripheries of said gasket, said shoulders defining an inwardly facing annular surface at the outer periphery of the convex frusto-conical surface and an outwardly facing annular surface at the inner periphery of the concave frusto-conical surface; the cone angle of said gasket being so related to the cone angle of said frusto-conical surfaces that when said members are forced axially toward each other to partially flatten and compress said gasket said opposed frusto-conical surfaces will engage opposed faces of said gasket to support the same against undue buckling as the partial flattening thereof compresses said gasket in a radial direction against said shoulders.

5. A joint structure as defined in claim 4, wherein said frusto-conical surfaces are parallel to each other and wherein said opposed faces of said gasket are parallel to each other.

6. A joint structure as defined in claim 4 wherein said gasket is of material softer than the material of said members.

7. A joint structure as defined in claim 4 wherein the cone angle of said frusto-conical surfaces is from 90° to 166°.

References Cited in the file of this patent

UNITED STATES PATENTS

| | | |
|---|---|---|
| 83,213 | Sanders | Oct. 20, 1868 |
| 541,736 | Friede | June 25, 1895 |
| 960,899 | Guyer | June 7, 1910 |
| 1,109,042 | Claflin | Sept. 1, 1914 |
| 1,201,400 | Watrous | Oct. 17, 1916 |
| 1,841,009 | Cantell | Jan. 12, 1932 |
| 1,866,160 | Griswold | July 5, 1932 |
| 1,927,987 | Lytell | Sept. 26, 1933 |
| 2,058,452 | Hoffman | Oct. 27, 1936 |
| 2,269,664 | Hallerberg | Jan. 13, 1942 |
| 2,377,891 | Laue | June 12, 1945 |
| 2,632,431 | Suter | Mar. 24, 1953 |
| 2,703,722 | Christophersen | Mar. 8, 1955 |
| 2,757,945 | Bingham | Aug. 7, 1956 |
| 2,818,282 | Herman | Dec. 31, 1957 |

FOREIGN PATENTS

| | | |
|---|---|---|
| 538,517 | Great Britain | Aug. 7, 1941 |